United States Patent [19]

Larson

[11] 4,158,370
[45] Jun. 19, 1979

[54] EXPLOSIVE ACTIVATED PLUG

[75] Inventor: Gordon C. Larson, Lynchburg, Va.

[73] Assignee: The Babcock & Wilcox Company, New York, N.Y.

[21] Appl. No.: 914,097

[22] Filed: Jun. 9, 1978

[51] Int. Cl.² ............................................. F16L 55/12
[52] U.S. Cl. .................................. 138/89; 29/421 E; 138/97
[58] Field of Search ........................... 138/89, 97, 1; 29/421 E, 421 R; 277/103

[56] References Cited

U.S. PATENT DOCUMENTS

| 3,090,113 | 5/1963 | Karpovich | 29/421 E |
| 3,235,944 | 2/1966 | Broske et al. | 29/421 E |
| 3,590,877 | 7/1971 | Leopold | 138/89 |
| 4,091,841 | 5/1978 | Beneker et al. | 138/97 |

Primary Examiner—Lenard A. Footland
Attorney, Agent, or Firm—Joseph M. Maguire; Edward A. Steen

[57] ABSTRACT

An explosive activated tube plug for effecting a mechanical seal within a tube is disclosed. The plug includes an internally tapered expansion sleeve, a frusto-conical piston disposed within the sleeve and an extension member to expedite plug placement. By remotely detonating an explosive disposed within the plug, the piston is driven forward to expand the sleeve against the surrounding tube surface. By modifying the physical structure of the plug, the energy-displacement relationship between the piston and sleeve may be selectively controlled.

5 Claims, 2 Drawing Figures

EXPLOSIVE ACTIVATED PLUG

BACKGROUND OF THE INVENTION

1. Field of the Invention

This invention relates to the art of repairing heat exchangers and more particularly to an explosive tube plug adapted to effectively seal defective heat exchanger tubes.

2. Description of the Prior Art

It has been determined that over the extended lifetime of a heat exchanger, a small number of heat exchanger tubes may develop cracks and leaks. Since it is undesirable to allow the normally separated fluids coursing through the exchanger from coming into direct contact with other, numerous techniques have been developed to seal the leaking tubes.

For example, these defective tubes may be sealed by employing welded plugs, explosively expanded plugs or mechanically driven plugs. Unfortunately, however, these methods present difficulties which may detract from their effectiveness.

Welded tube plugs require direct access to the tube sheets disposed within the exchanger. Often times such access may prove to be quite difficult. Generally, a solid plug is inserted into each end of the defective tube. A weld bead is then deposited about the circumference of the tube plug to insure a pressure tight seal between the plug and the tube wall. Unfortunately, it has been learned through experience that fluid may penetrate the tube-plug interface and corrode the weld bead thereby causing leakage and rendering the whole procedure useless.

Mechanically driven plugs are difficult to install consistently.

The explosive plugs presently in use form a metallurgical bond between the tube and the plug. Unfortunately, it is feared that the relatively uncontrolled explosive force necessary for this procedure may distort the thin ligaments located between adjacent tubes in the tube sheets.

SUMMARY OF THE INVENTION

The present invention successfully combines the successful attributes of both the mechanically driven plugs and the explosive plugs without the debilitating factors attendant thereto.

The tube plug consists of a hardened tubular explosive case joined to an expansion sleeve. The expansion sleeve is composed of first and second chambers of unequal circular cross section and an intermediate conical chamber interposed therebetween. In addition, a frusto-conical piston equipped with an optional stem is fitted within the sleeve. A threaded extension member is attached to the explosive case to expedite plug installation. A suitable explosive charge is placed within the case and is remotely ignited to drive the piston further into the sleeve to cause the sleeve to expand against the surrounding tube surface.

By varying the size of the plug, the internal geometry of the sleeve, the length of the stem, and the explosive charge, the degree of sleeve expansion may be selectively controlled. In addition, by employing a vent in the first chamber of the sleeve, the degree of sleeve expansion may be further modulated.

DESCRIPTION OF THE PREFERRED EMBODIMENT OF THE INVENTION

Figure 1:
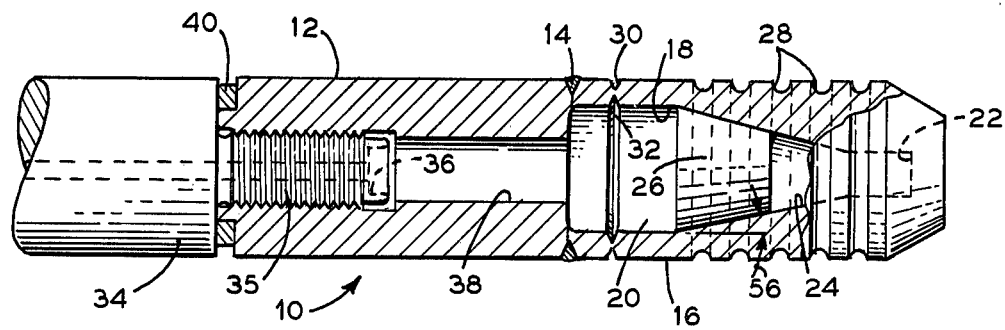
FIG. 1 is a cross section of the tube plug.

Referring to FIG. 1, there is shown an explosive plug 10. The plug 10 consists of a hardened tubular explosive case 12 welded or otherwise joined at joint 14 to the open ended segment of expansion sleeve 16. A breech 38 is located within the case 12. Disposed within the sleeve 16 is a sleeve cavity 18. The cavity 18 is subdivided into three chambers. First chamber 20 and second chamber 22 are of unequal circular cross section whereas intermediate chamber 24 has a frusto-conical cross section. The second chamber 22, which is smaller than the first chamber 20, acts both as a shock absorber and as a means to further expedite sleeve 16 expansion. A frusto-conical piston 26 is disposed flush against the interior wall of the intermediate chamber 24. The exterior surface of the sleeve 16 may be circumscribed by a number of grooves 28. Angle 56 represents the taper angle of the intermediate chamber 24. In addition, circumferential notches 30 and 32 may be employed as well. The use and deployment of the grooves 28 and the notches 30 and 32 will readily become apparent from the following discussion.

An extension member 34, useful for expediting plug placement, is threadably engaged to the plug 10. Washer 40 may be employed to effect a sealed fit between the extension member 34 and the case 12. A detonator cavity 36 is located in threaded tip 35 of the extension member 34.

Figure 2:
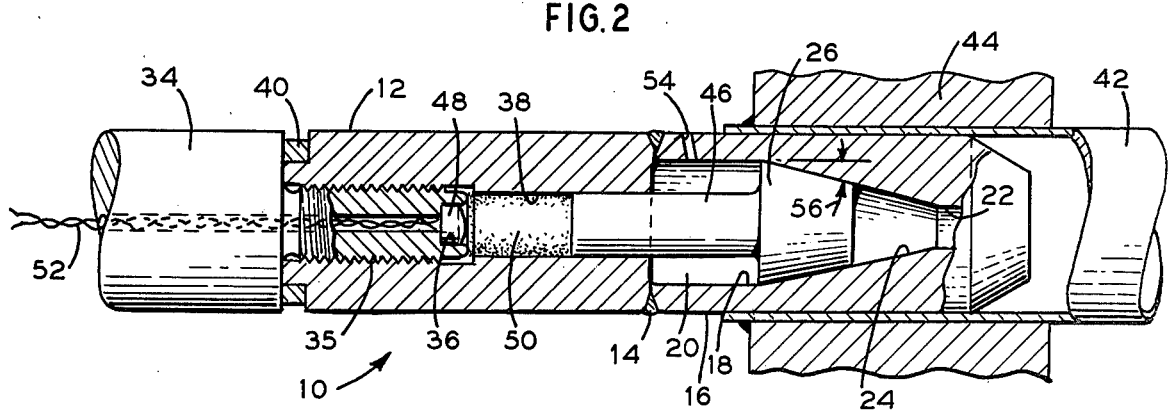
FIG. 2 is an alternate embodiment of the tube plug.

FIG. 2 shows an alternate embodiment of the plug 10 inserted within a tube 42 and readied for firing. The tube 42 is positioned within tube sheet 44.

In the embodiment depicted by FIG. 2, the piston is equipped with an optional stem 46. The length of the stem 46 need not be fixed. Rather, depending on the circumstances, any stem length may be selected so long as the stem at least partially extends into the case 12. Furthermore, the plug 10 is equipped with an optional vent 54. The function of the vent 54 will become readily apparent from the ensuing discussion.

A detonator 48 is placed within the detonator cavity 36. Detonator wires 52 are shown entering the extension member 34. A suitable explosive charge 50 is placed within the breech 38.

It is contemplated that the plug 10 will be used in the following manner. After the defective tube has been located, a primed plug 10 detachably connected to an extension member 34 of suitable length will be placed within the bore of the tube at the tube sheet. The directional orientation of the plug is of no moment, since the plug may either face toward the tube sheet face or toward the tube bundle. It is of no concern which way the plug 10 ultimately faces since the formation of the leakproof seal between the plug and the tube wall is independent of the orientation of the plug. As a consequence, a lower tube seal may be effectuated by first inserting the plug into the tube at the upper tube sheet and then pushing it down through the tube. After the plug is detonated, the extension member 34 is detached from the plug and removed from the bore of the tube. The upper plug is then inserted in a similar manner resulting in both plugs facing in the same downward direction. Obviously, the operation may be either reversed or the plugs may be inserted from opposite directions.

In the preceeding example, a vertical tube was selected for illustrative purposes only. It should be appreciated that the orientation of the tube is irrelevant for the purpose of securing a leak-proof seal within the tube. Note, however, that regardless of the orientation of the tube, the plug should be inserted within the tube in the region where the tube sheet circumscribes the tube.

After the plug is inserted and located at the proper location, the explosive is remotely ignited, thereby forcing the piston against the tapered internal wall of the intermediate chamber 24. As a result, the sleeve 16 will be radially deformed outwardly, forcing the plug 10 to form an effective mechanical leak-proof seal with the internal wall of the tube. The extension member 34 is then unthreaded from the case and removed from the tube.

The plug 10 is quite versatile with regard to sealing defective tubes. By altering the internal geometry of the plug, and its components, and almost limitless number of control variations may be utilized to modulate the degree of plug expansion.

It was previously noted that the known explosive plugs may cause undesirable strain on the ligaments of the tube sheets. The instant invention alleviates this problem by allowing the technician to control the degree of plug expansion so as to prevent excessive distortion of the tube sheet while simultaneously minimizing the risks engendered by the generally brittle behavior of tube and tube sheet materials which may become evident during plug installation.

For example, the explosive force behind the piston may be limited by incorporating either an internal circumferential notch 32 or an external circumferential notch 30 in the sleeve 16. See FIG. 1. This orientation will initiate the separation of the sleeve 16 from the case 12 at a predetermined force. By varying the depth of the notch employed, the degree of plug expansion may be controlled since a portion of the explosive energy will be used in causing the fracture of the notch. Furthermore, the sleeve 16 may be simultaneously equipped with notches 30 and 32 as well. As a consequence of this design, the extension 34 may be then removed without the need for unthreading it from the case 12.

Alternatively, the extension 34 may be designed to separate at a desired force, thereby exposing the explosive force to the environment and discharging the excess energy contained therein.

The expansion of the plug may be further controlled by inserting a vent 54 in the first chamber 20 of the sleeve 16 in the immediate vicinity of the joint 14. See FIG. 2. By judiciously manipulating the length of the stem 46, it is possible to modulate the extent to which the piston 26 is exposed to the explosive force discharged in the breech 38. It should be understood that at the instant the stem 46 leaves the breech 38 ("the exhaustion point"), the remaining explosive energy will escape to the atmosphere via vent 54. As a consequence, piston and sleeve displacement will naturally cease. By employing a longer steam, the onset of the exhaustion point may be delayed, thereby allowing greater piston (and sleeve) displacement. Conversely, a shorter stem will accelerate the onset of the exhaustion point, thereby resulting in a smaller piston (and sleeve) displacement. If the vent option is selected, it should be obvious that the portion of the sleeve 16 equipped with the vent 54 must be exposed to the environment so that the excess energy may be vented outward rather than against the stem 46.

As a further attestation to the versatility of the invention, the relation between the energy available from the explosive charge 50 and the internal geometry of the plug 10 may be altered to effect the desired degree of expansion. If, for example, a relatively large taper angle 56 is selected, greater sleeve deformation will result. Conversely, if a relatively small taper angle 56 is selected, lesser sleeve deformation will result.

Other variables which may be employed include varying the diameter of the stem 46, varying the diameter of the breech 38 and varying the strength of the explosive charge. By omitting the stem 46 entirely (as in FIG. 1) greater force would be exerted on the piston 26. In addition, the coefficient of friction between the piston 26 and the internal wall of the sleeve cavity 18 may be varied, thereby altering the energy-displacement relationships of the plug 10.

It should be appreciated that by eliminating the stem 46 and permitting a portion of the explosive charge to enter the first chamber 20, the characteristics of the expansion process may be transformed from a direct expansion engendered solely by the linear displacement of the stem-piston combination to a combined expansion effect precipitated by both the radial displacement of the sleeve 16 caused by the explosive, contained within the chamber 20, and the linear displacement caused by the stemless piston.

The sleeve 16 may include circumferential grooves 28, as in FIG. 1 or be smooth, as in FIG. 2, depending on the service conditions, materials and tube conditions. The grooves 28 would tend to be extruded into the wall of the tube to be sealed and form a leakproof serrated seal therebetween.

While in accordance with the provisions of the statutes, there is illustrated and described herein a specific embodiment of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An explosive-activated plug for mechanically sealing a tube comprising an expansion sleeve open at one end and closed at the other end and having a partially tapered internal cross section, a hardened tubular explosive case joined to the open-ended portion of the sleeve, a frusto-conical piston disposed within the sleeve and in contiguous contact with the interior walls thereof, an extension member detachably affixed to the case, explosive means disposed within the case and operable from a location outside thereof to cause the piston to expand the sleeve against the surrounding tube surface to effectuate a leak-proof seal therewith.

2. The explosive-activated plug according to claim 1 wherein the sleeve includes first and second chambers of unequal circular cross section and a frusto-conical chamber interposed therebetween.

3. The explosive-activated plug according to claim 1 including a stem affixed to the piston, the stem extending at least partially into the case.

4. The explosive-activated plug according to claim 1 wherein the extension member threadably engages the case.

5. The explosive-activated plug according to claim 1 wherein a vent is formed in the sleeve adjacent to said case.

* * * * *

UNITED STATES PATENT AND TRADEMARK OFFICE
CERTIFICATE OF CORRECTION

PATENT NO. : 4,158,370
DATED : June 19, 1979
INVENTOR(S) : Gordon C. Larson

It is certified that error appears in the above-identified patent and that said Letters Patent are hereby corrected as shown below:

Column 1, line 16; the word --each-- should be inserted between "with" and "other".

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*